United States Patent [19]

Contastin

[11] 4,285,893
[45] Aug. 25, 1981

[54] METHOD AND DEVICE FOR FORMING PLASTIC CELLULAR MATERIAL IN A MOLD FROM A FOAMABLE LIQUID REACTION MIXTURE

[75] Inventor: André Contastin, Severac-le-Chateau, France

[73] Assignee: Industries et Techniques d'Ameublement, Severac-le-Chateau, France

[21] Appl. No.: 44,490

[22] Filed: Jun. 4, 1979

[30] Foreign Application Priority Data

Jun. 13, 1978 [FR] France .................. 78 18325

[51] Int. Cl.$^3$ ............................................. B29D 27/04
[52] U.S. Cl. ........................................ 264/54; 249/165; 264/40.4; 264/101; 264/321; 425/140; 425/405 R; 425/451.9; 425/812; 425/817 R; 425/DIG. 60
[58] Field of Search ............... 264/51, 54, 41, 101, 264/321, 331, 40.4; 249/53, 165, 163; 425/85, 405 R, DIG. 60, 817 R, 140, 451.9, 812

[56] References Cited

U.S. PATENT DOCUMENTS

| 3,070,126 | 12/1962 | Schneider ............... 425/405 R X |
|---|---|---|
| 3,131,426 | 5/1964 | Legler .......................... 264/321 X |
| 3,267,517 | 8/1966 | Altermatt .................. 425/DIG. 60 |
| 3,317,641 | 5/1967 | Heier ........................... 264/101 X |
| 3,475,525 | 10/1969 | Peters .......................... 264/321 X |
| 3,608,023 | 9/1971 | Scarborough ............. 264/101 X |
| 3,640,663 | 2/1972 | Hampel et al. ........... 425/405 R X |
| 3,664,786 | 5/1972 | Devine ........................ 264/101 X |
| 3,833,694 | 9/1974 | Hughes ..................... 425/405 R X |
| 3,865,532 | 2/1975 | Sakuma ................... 425/DIG. 60 |
| 3,878,279 | 4/1975 | Sorrells ....................... 264/101 X |
| 3,903,223 | 9/1975 | Van Der Hoek .......... 264/101 X |
| 3,970,732 | 7/1976 | Slaats et al. ............... 264/101 X |
| 4,045,527 | 8/1977 | Babayan et al. .......... 264/101 X |

OTHER PUBLICATIONS

Ferrigno, T. H., "Rigid Plastics Foams," New York, Reinhold, ©1963, pp. 42–46.

Primary Examiner—Philip Anderson
Attorney, Agent, or Firm—Shlesinger, Arkwright, Garvey & Dinsmore

[57] ABSTRACT

In the course of this method, an amount of expansible mixture is poured into a mould, after which the mould is obturated by means of a plug. A vacuum is created in the chamber of the mould by way of the plug so as to cause the foaming of the mixture. The vacuum is maintained for a period after the foamable mixture has filled the whole of the volume of the mould. At the end of the polymerization of the foamable mixture, the vacuum may be re-applied in the mould, preferably for several cycles, so as to cause the cells of the foam obtained to burst.

15 Claims, 3 Drawing Figures

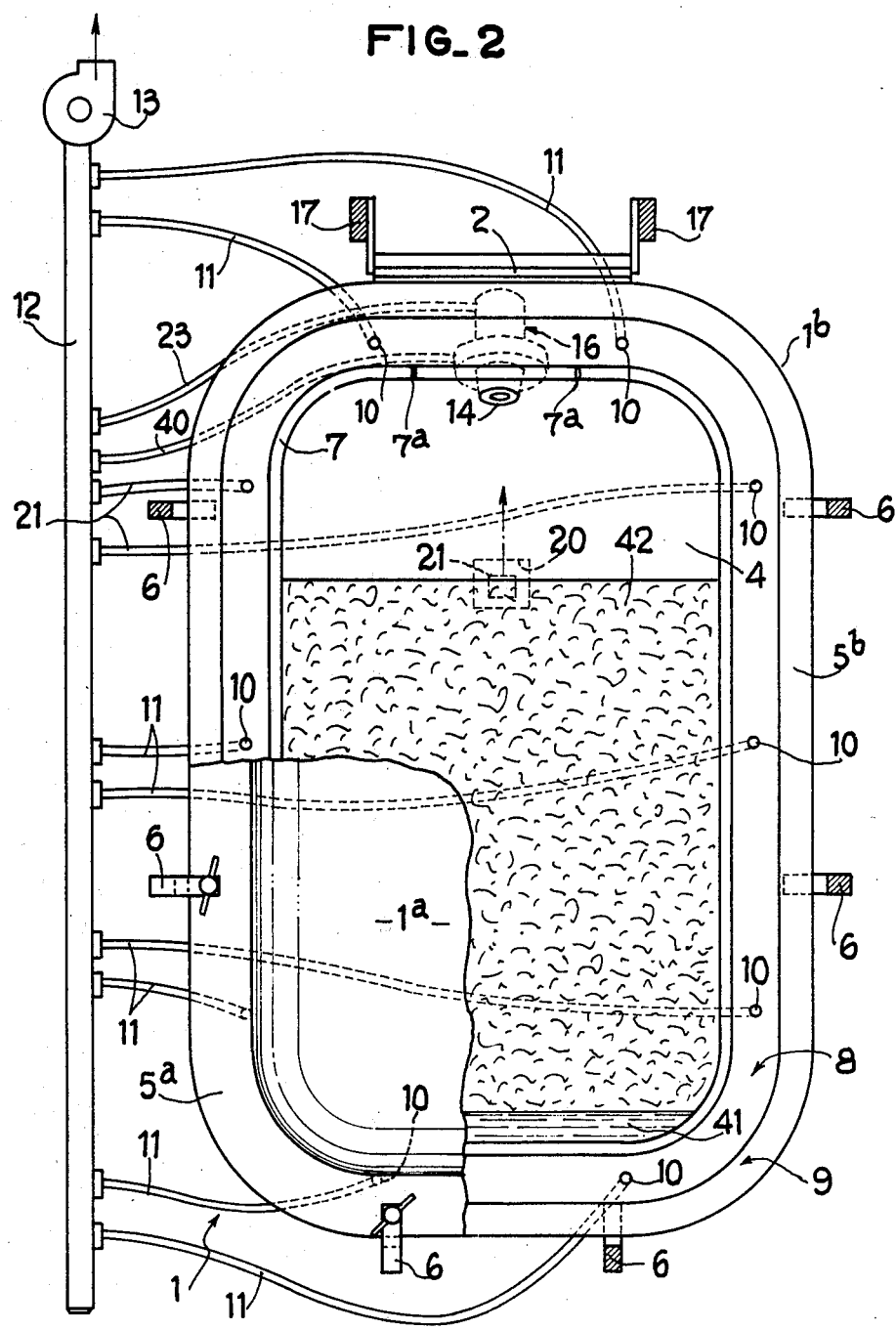
FIG_2

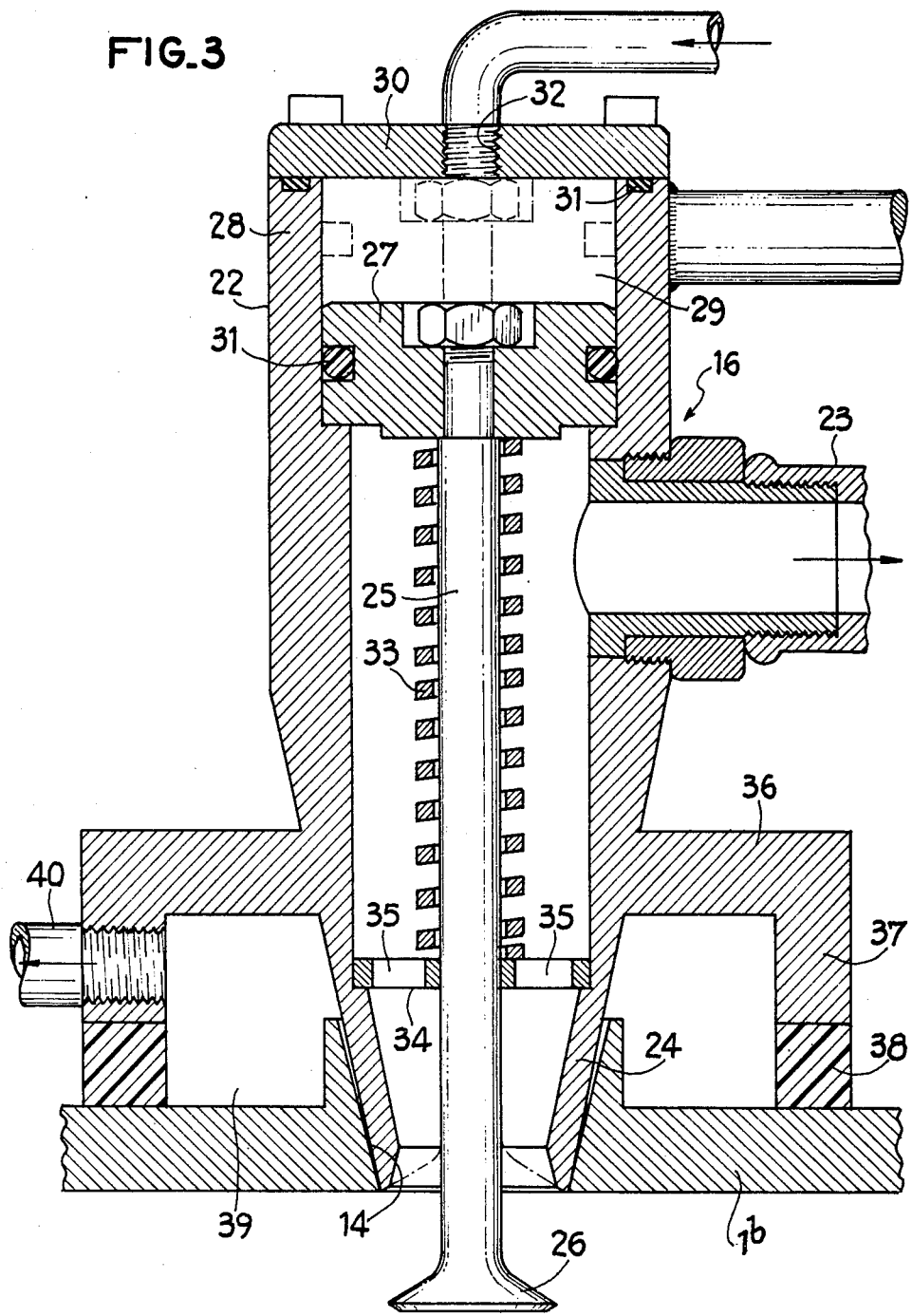

METHOD AND DEVICE FOR FORMING PLASTIC CELLULAR MATERIAL IN A MOLD FROM A FOAMABLE LIQUID REACTION MIXTURE

DESCRIPTION

The present invention relates to the production of objects of cellular material from a foamable liquid reaction mixture, a relatively small amount of which is placed in a mould in which the mixture is made to foam, this mixture being contained by the walls of the mould which determine the final shape of the object.

It is known to promote the foaming of such reaction mixtures by incorporating therein a blowing agent in a variable proportion chosen above all in accordance with the desired density of the object. In the case of polyurethane foams (cold foaming), this foaming agent is usually Freon which has several drawbacks. Indeed, this product, 2 to 30% by weight of which must be employed in the reaction mixture, is expensive and consequently forms a considerable part of the cost of the object. Further, the Freon effectively operates at a given temperature between about 30° and 35° C. whereas, owing to its rapid evaporation required for the foaming, it cools the mould and this may require a continuous heating thereof in order to compensate for this loss of heat. Furthermore, after expansion and polymerization of the material in the mould, the whole of the Freon must be discharged to the atmosphere and it is known that this product is harmful to the environment since it attacks the protective layer of ozone of the earth.

It is also known to create a vacuum inside the mould when introducing the mixture in the latter so as to accelerate the expansion of the material. However, this vacuum is applied for only a short time and is rapidly destroyed by the positive pressure created by the increase in volume of the foam. A blowing agent consequently is still necessary for the carrying out of this method.

An object of the invention is to provide a method and an apparatus for manufacturing objects of foamable material, in particular of polyurethane foam, which requires no use of a blowing agent acting by evaporation in the mixture introduced in the mould and permits a cheaper manufacture of the objects than was heretofore possible.

According to the invention, there is provided a process for manufacturing objects having a cellular structure in a mould, comprising pouring through a pouring aperture formed in the wall of the mould a liquid mixture which is the precursor of the polymer material which is desired to be foamed so as to produce the final object, thereafter obturating said pouring aperture so as to allow the expansion and the polymerization of said mixture, and stripping the object from the mould, said process further comprising maintaining a vacuum in said mould by way of the obturation until the foaming material is polymerized.

Owing to these features, due to the mere fact of maintaining a vacuum in the mould, it is possible to completely avoid the use of blowing agent acting by evaporation in the initial mixture. This results in the avoidance of an additional treating of the mould and even in a reduction in the temperature at which the mould is maintained in the course of the method, this temperature being for example between 20° and 30° C. instead of at least 32° C. when Freon is employed as in the prior art.

Moreover, it is known that it is often desirable to produce the bursting of the cells of mass of the cellular structure after it has assumed its final shape, so as to render this mass more flexible. In the prior art, the object after having been stripped from the mould, is introduced in a chamber in which there are alternately created a pressure and a vacuum, possibly several times, so as to rupture the walls of the cells of the cellular structure. Apart from the fact that this operation gives off the particular blowing agent still contained in the cells (with a further emanation of harmful gas), it has the drawback of requiring further handling of the objects.

According to another feature of the invention, the at least partial bursting of the cells of the structure is achieved in the mould itself and, for this purpose, the method according to the invention also comprises suddenly re-applying the vacuum to the mould after the end of the polymerization of the foamable mixture. Preferably, this re-application of the vacuum is carried out in a plurality of cycles, an appropriate number of cycles being, for example, three or four.

Another object of the invention is to provide a device for manufacturing objects having a cellular structure in accordance with the method defined hereinbefore.

Further features and advantages of the invention will be apparent from the ensuing description which is given solely by way of example with reference to the accompanying drawings, in which:

FIG. 2 is an elevational view, with a part cut away, of the device of FIG. 1 taken on line 2—2 of the latter;

FIG. 3 is a sectional view, to an enlarged scale, of a detail of the device comprising the plug according to the invention.

Figure 1:
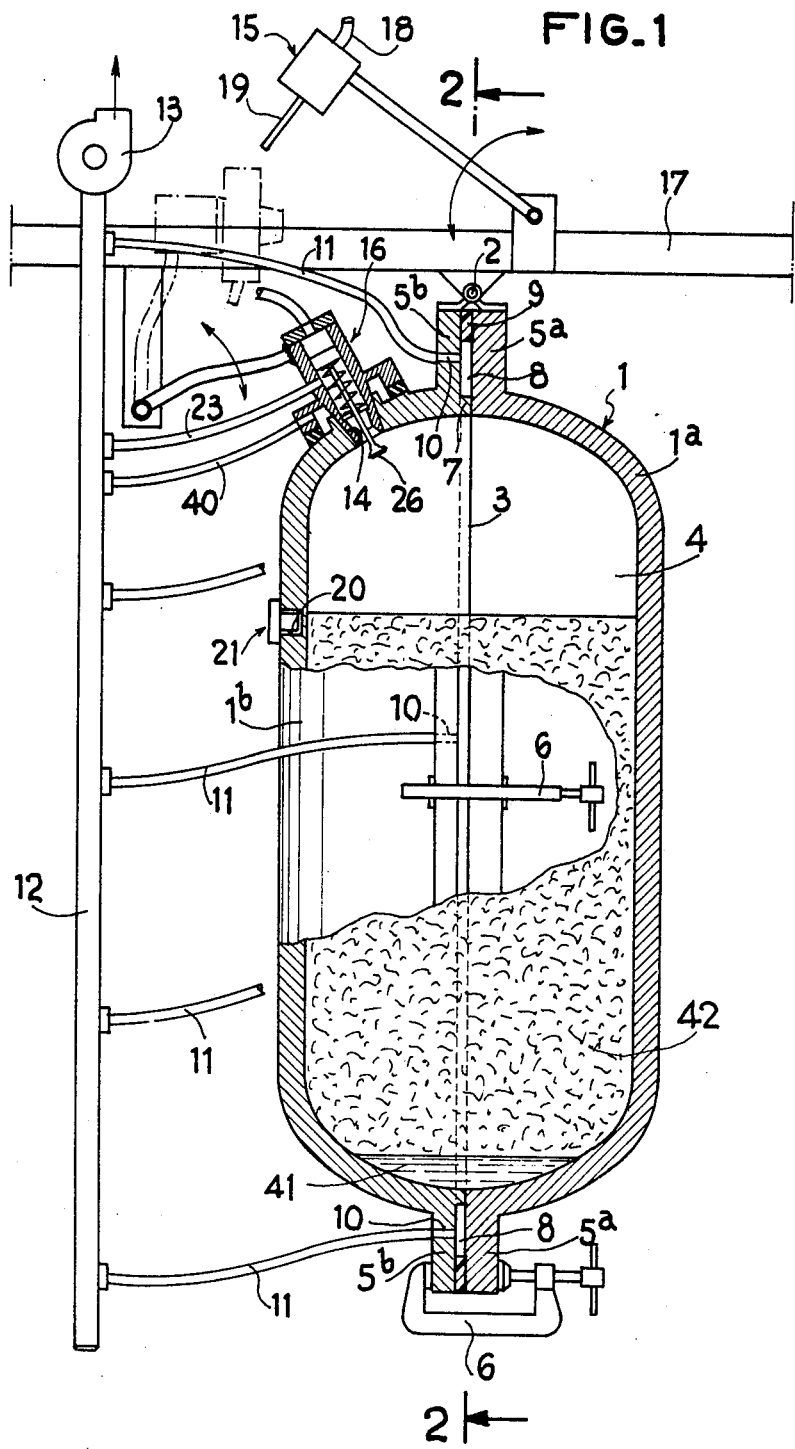
FIG. 1 is an elevational view, partly in section, of a device for manufacturing objects having a cellular structure according to the invention.

In the embodiment shown in FIGS. 1 and 2, the device for carrying out the method of the invention comprises a mould 1 having two half-shells 1a and 1b which are interconnected to pivot about a horizontal pivot pin 2 and define a vertical joint plane 3.

In the illustrated embodiment, the mould defines a foaming chamber 4 whose wall for example defines the shape of a seat cushion. It must be understood that this shape is not intended to be limitative of the scope of the invention.

Each half-shell has a peripheral flange 5a, 5b and the flanges are maintained, when the mould is closed, by locking devices 6 of any known type.

It can be seen that the flange 5b of the half-shell 1b is not flush with the edge of the latter but slightly set back so as to form a peripheral rib 7 on the inner contour of the edge of this half-shell, the face of this rib 7 being adapted to be applied against the confronting face of the other half-shell. With this arrangement, the two flanges 5a and 5b define an annular vacuum chamber 8 which is outwardly bordered by a sealing element 9, for example of rubber compressed by the two flanges 5a and 5b when the mould 1 is closed. Moreover, the flange 5b has a plurality of orifices 10 which are connected by flexible pipes 11 to a vacuum pipe 12 which is connected to a suction pump 13. In the upper part of the half-shell 1a, the rib 7 is interrupted in several regions by notches forming vents 7a which put the chambers 4 and 8 in communication.

The half-shell 1b also has a pouring aperture 14 of frustoconical and outwardly divergent shape. There may be placed in this pouring aperture alternately a pouring head 15, as shown, and an obturating plug 16.

The pouring head 15 is pivotally mounted on a fixed frame 17 and connected by a pipe 18 to a supply device (not shown) in which there are prepared the ingredients of the precursor of foaming material intended to form the object. A drive device (for example a cylinder structure not shown) permits placing the pouring head in either of its two positions. The pouring head comprises an injector pipe 19 adapted to be inserted in the aperture 14.

The plug 16 is also pivotally mounted on the fixed frame 17 and can consequently occupy a withdrawn position (shown in dot-dash lines) and an active position (shown in FIG. 1).

A cavity 20 is formed on the outside of the wall of the half-shell 1b. The inner end of this cavity is separated from the foaming chamber 4 by a thin partition wall against which a level detector 21 is placed. The latter delivers a signal when the foam reaches the corresponding level in the mould 1.

FIG. 3 shows to an enlarged scale the oburating plug 16. The latter comprises a tubular member 22 which is connected by a pipe 23 to the pipe 12 and has a frustoconical end portion 24 which may be engaged in a sealed manner in the pouring aperture 14 of the mould 1.

Mounted inside the tubular member 22 in coaxial relation thereto, is a rod 25 whose enlarged end portion 26 forms a valve closure element which, in the opening position, is located outside the tubular member 22 and, in the closing position, is adapted to bear against the end portion 24 which therefore defines a valve seat.

The other end of the rod 25 is rigid with a piston 27 which is movable coaxially of the tubular member 22 in a cylindrical portion 28 formed at the end of the tubular member opposed to its frustoconical portion 24.

The chamber 29 defined between the piston 27 and the inner end wall 30 of the tubular member 22 is rendered fluidtight by seals 31 which are mounted between the end wall 30 and the tubular member 22 and between the piston 27 and the tubular member 22. The piston 27 thus constitutes a single-acting cylinder structure for shifting the rod 25.

The end wall 30 of the tubular member 22 has an orifice 32 for air under pressure whereby it is possible to connect the chamber 29 to a source of air under pressure (not shown).

Mounted on the rod 25 is a coil return spring 33 which bears against the piston 27 and against a washer 34 having openings 35 for the passage of fluid between the mould 1 and the vacuum or suction pipe 23.

This washer 34 moreover performs the function of an abutment for the coil spring 33 and the function of a guide bearing for the rod 25 of the piston 27.

The tubular member also has, near to its frustoconical end portion 24, a cup 36 whose peripheral edge 37 extends toward this end portion. A sealing element 38 is fixed, for example by adhesive bonding, to this edge and bears against the outer face of the half-shell 1b, when the plug is in position in the pouring aperture 14. The cup 36 and the sealing element 38 thus define with this face a suction chamber 39 which communicates with the pipe 12 by way of a pipe 40.

Note that there has just been described a device for forming objects having a cellular structure which has only a single mould. By way of a modification, and moreover conventionally it is possible to provide a group of moulds placed on a turntable for example and receiving at the appropriate moment a common pouring head. In this case, the plug 16 is pivotally mounted on the turntable and not on the frame 17 which carries the pouring head 15.

The method according to the invention is carried out in the following manner:

The empty mould 1 is closed and locked by means of the locking devices 6; the plug 16 and the pouring head 15 are withdrawn from the pouring aperture 14. The pouring head receives the ingredients of the precursor of the synthetic material which subsequently forms the foam material. An example of a composition which may be employed and gives a polyurethane foam is the following:

Ingredient (1): a mixture of polyol, water, additives such as catalysts and stabilizing agents and a cross-linking agent.

Ingredient (2): a mixture of 60% of diphenylmethane diisocyanate and 40% of toluene diisocyanate.

Note that in this precursor the complete absence of a blowing agent acting by evaporation such as Freon.

When the precursor has been suitably mixed in the pouring head 15 and the latter has been placed in the pouring aperture 14, a given amount 41 of foamable mixture is poured into the mould and starts to react.

Immediately after, the pouring head 15 is withdrawn and the plug 16 is placed in position and obturates the pouring aperture. The pipe 23 is permanently connected to the source of vacuum (pump 13) and there prevails a vacuum which may reach 100 to 700 mmHg (absolute pressure, 660 to 60 mmHg). As soon as the plug 16 has been placed in position, fluid is made to arrive in the orifice 32 so that the piston 27 moves downwardly and urges the closure member 26 away from its seat. The mould is consequently put under a vacuum at the same value as the pipe 12.

The chamber 4 of the mould is put under vacuum by way of the plug 16 and the vents 7a. However, the rate at which the fluid is evacuated from the mould by way of the plug 16 is distinctly higher than that of the fluid by way of the vents 7a, which could not alone ensure the foaming of the mixture from the beginning to the end. Consequently, the foamable mixture 42, by reacting under the effect of the vacuum created first at a high rate, increases in volume until its upper level reaches the detector 21 which must be judiciously positioned so that the valve 26 closes before the foamable mixture is able to enter the plug 16. In view of the small volume of air which remains to be evacuated, the vents 7a may be of small size. Generally, the height of the detector is determined for each particular case and may be different for each mould.

When the mixture reaches the detector 21, the latter brings about the suppression of the pressure in the chamber 29 and the piston 27 is returned by the spring 33 to its upper position in which it applies the closure member 26 against its seat which completes the putting under vacuum by way of the plug 16. Thereafter, the expansion of the foamable mixture is terminated by means of the vents 7a which put the chamber 4 in communication with the chamber 8 in which a vacuum still prevails. The latter is maintained after the foam has occupied the whole of the volume of the mould until the product has polymerized. The period during which the vacuum is maintained after closure of the valve 24, 26 may be about 2 to 5 minutes and preferably roughly 3 minutes.

At the end of the foaming, the plug 16 remains in position for about 2 to 5 minutes so as to complete the polymerization of the synthetic material after which the pressure is once more applied preferably several times above the piston 27. Consequently, the foaming chamber 4 is repeatedly put under vacuum which at least partly bursts the cells of the cellular structure and furthermore facilitates the stripping of the cellular structure from the mould. It will be observed that this operation requires no handling of the object formed, the vacuum being always applied by way of the plug 16.

It will also be observed that, according to an advantageous and even sometimes essential feature of the invention, the presence of a source of vacuum is utilized also for achieving the seal in the region of the joint plane of the mould 1 and the pouring aperture 14 obturated by the plug 16.

Indeed, it has been mentioned that the rib 7 between the half-shells 1a and 1b does not alone ensure the airtightness. Consequently, when a vacuum is produced in the chamber 4, the surrounding air could enter the chamber by way of the gap between this rib 7 and the confronting face of the other half-shell 1a. This air entering the mould could then create large air pockets in the still liquid foam.

The arrangement of the annular vacuum chamber 8 which is bordered on the outside by the sealing element 9 consequently renders the mould sealed from the exterior so that the foam in the course of formation has no tendency to exhibit surface defects. The same result is obtained in the region of the pouring aperture 14 owing to the presence of the annular chamber 39 which is formed around the plug 16 and which is maintained under vacuum by way of the pipe 40.

The temperature at which the method is carried out may be between 20° and 30° C. and no heating is necessary for compensating for loss of heat due to the evaporation of a blowing agent.

The value of the vacuum may be around 100 and 700 mmHg depending on whether it is desired to obtain a foam of low density or a foam of higher density respectively.

It will be understood that it is possible to place in the mould a framework adapted to reinforce the object having a cellular structure as is well known in the art.

Moreover, the suction pipe draws off the harmful gases which may come from the mixture in the course of polymerization, so that their escape to the surrounding air may be easily prevented with the aid of filters or other means.

Having now described my invention what I claim as new and desire to secure by Letters Patent is:

1. Method for producing an object having a cellular structure in a mold, comprising two pivotally connected half-shells having a common joint plane and each having a shape corresponding to a part of the outer shape of the object to be produced, one of said half-shells having at least an aperture therein, said method comprising pivotally joining said half-shells together along said joint plane so as to form a closed mold cavity, pouring through said aperture a liquid mixture which is the precursor of a polymer material to be foamed to produce the finished object, said mixture being free from any blowing agent acting by evaporation, thereafter momentarily obturating said aperture, subsequently applying a vacuum through said aperture for establishing and maintaining a subatmospheric pressure in said mold cavity so as to allow the expansion of said mixture, said vacuum being maintained from the time of obturation until the foamed mixture is polymerized, releasing the vacuum from the mold and stripping the object from the mold.

2. Method as claimed in claim 1, including reducing the rate at which fluid is evacuated from the mould to create said vacuum when the foamed mixture occupies substantially the whole of the volume of the mould.

3. Method as claimed in claim 2, wherein after the reduction in the rate of putting the mould under vacuum, fluid evacuation at a low rate is maintained for substantially 2 to 5 minutes.

4. Method as claimed in claim 1, 2 or 3, comprising providing a peripheral vacuum chamber in the joint plane outside said mold cavity and connected to the mold cavity by a plurality of passages formed in at least one of said half-shells, and applying a vacuum to said peripheral vacuum chamber.

5. A method as in claim 1, 2 or 3 and including providing a plug member insertable in said aperture for obturating said aperture, said plug member including an annular flange portion sealingly engageable with the wall of the half-shell surrounding said aperture and forming an annular vacuum chamber for maintaining sealing engagement between said plug member and said wall.

6. A method as in claim 1, 2 or 3 and including prior to stripping of the object from the mold subjecting the mold cavity to a cycle of reapplying the vacuum to the mold cavity and rereleasing the vacuum from the mold cavity.

7. Method as claimed in claim 6, wherein the vacuum is re-applied in a plurality of said cycles.

8. Device for producing objects having a cellular structure comprising at least one mold having two flanged half-shells capable of being assembled on a joint plane, means defining in the mold an aperture by way of which aperture there is introduced in the mold a foamable liquid precursor of a polymer material for producing the finished object, a removable plug cooperative with the aperture, the plug comprising a tubular member defining an inner chamber and having an open end portion which is engagable in the aperture, the open end portion of the tubular member defining a valve seat, a valve closure member cooperative with the seat for closing said end portion, control means for directing movement of the closure member between a closed and an open position wherein said closure member respectively engages and disengages said seat, means located in the wall of one of said two half-shells and capable of detecting a level of the foam expanding in said mold and sending a signal to said control means for actuating said closure member when the foam reaches said level.

9. Device as claimed in claim 8, wherein the closure member is located on the outside of the tubular member so as to be capable of insertion in the mold, the device further comprising a rod which is located substantially axially inside the tubular member and extends partially into the mold when said closure member is in said open position and carries the closure member adjacent a first end of the rod and said control means comprising shifting means for the rod cooperative with a second end of the rod opposite said first end of the rod.

10. Device as claimed in claim 9, wherein the shifting means for the rod comprise a cylindrical second chamber defined in the tubular member adjacent an end of the tubular member opposed to said open end portion, and a piston movably mounted inside the cylindrical chamber, a pipe connected to the source of vacuum communicating with the first-mentioned inner chamber between the open end portion of the tubular member and the piston.

11. Device as claimed in claim 10, wherein the piston is part of a single-acting cylinder structure comprising an orifice for supplying air under pressure to said second chamber and a return coil spring engaged on the rod and bearing against the piston and against a fixed member which is rigid with the tubular member and located adjacent the open end portion of the tubular member.

12. Device as claimed in claim 8, 9, 10 or 11, comprising vents formed in an upper part of the mold and means for putting the vents in communication with said source of vacuum.

13. Device as claimed in claim 8, 9, 10 or 11, comprising, in a region of the joint plane of the two half-shells, a rib which is part of one of the half-shells so that the mould has a substantially continuous inner wall, each half-shell comprising an outer flange, a sealing element engaged between outer peripheral portions of said flanges and defining with the flanges around said rib an annular chamber, and means putting the annular chamber in communication with said source of vacuum.

14. Device as claimed in claim 12, comprising, in a region of the joint plane of the two half-shells, a rib which is part of one of the half-shells so that the mould has a substantially continuous inner wall, each half-shell comprising an outer flange, a sealing element engaged between outer peripheral portions of said flanges and defining with the flanges around said rib an annular chamber, and means putting the annular chamber in communication with said source of vacuum, said vents being defined by notches in said rib.

15. Device as claimed in claim 8, 9, 10 or 11, wherein said tubular member further comprises, adjacent to said open end portion, a cup having a free edge portion, a sealing element carried by the free edge portion and adapted to bear against an outer wall of the mold, said cup defining with said sealing element and said wall in the obturating position of the plug an annular chamber, and means putting said source of negative pressure in communication with the annular chamber defined by the cup.

* * * * *